J N. MEYERS.
EDUCATIONAL DEVICE.
APPLICATION FILED MAR. 16, 1921.

1,419,882.

Patented June 13, 1922.

WITNESSES.

INVENTOR
J NICHOLAS MEYERS
BY
ATTORNEYS ic
UNITED STATES PATENT OFFICE.

J NICHOLAS MEYERS, OF PHILADELPHIA, PENNSYLVANIA.

EDUCATIONAL DEVICE.

1,419,882.  Specification of Letters Patent.  Patented June 13, 1922.

Application filed March 16, 1921. Serial No. 452,885.

*To all whom it may concern:*

Be it known that I, J NICHOLAS MEYERS, a citizen of the United States, and a resident of Philadelphia, in the county of Philadelphia and State of Pennsylvania, have invented a new and Improved Educational Device, of which the following is a full, clear, and exact description.

The present invention relates to new and useful improvements in educational appliances.

The invention has for its object to provide a device adapted to aid in teaching of drawing, more particularly of the free-hand type.

It is a further object of the invention to so construct a device of this character that certain portions of the sketches to be reproduced are committed to memory before the actual drawing operation.

It is a further object of the invention to construct a device of this character in compact form in order that the same may be more convenient to handle.

With the above and other objects in view which will appear as the nature of the invention is better understood, reference is had to the accompanying drawings, in which—

Figure 1:
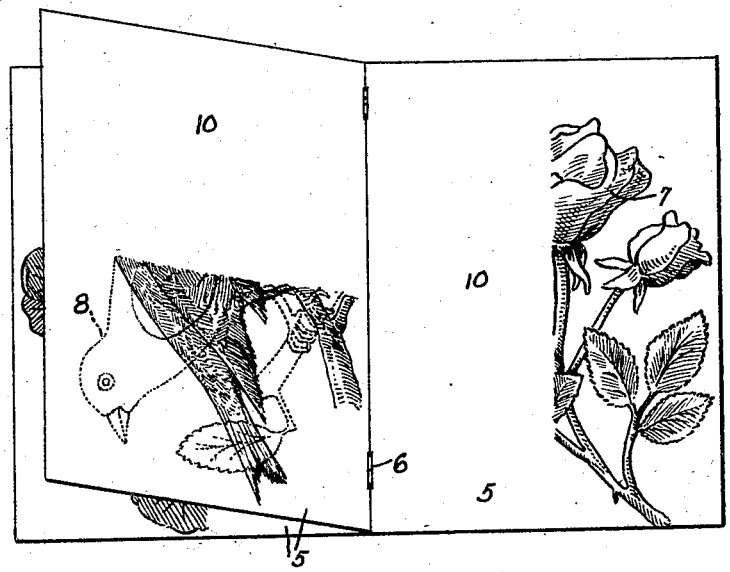
Figure 1 is a plan view partly in perspective of a device constructed in accordance with the present invention.
Figure 2:
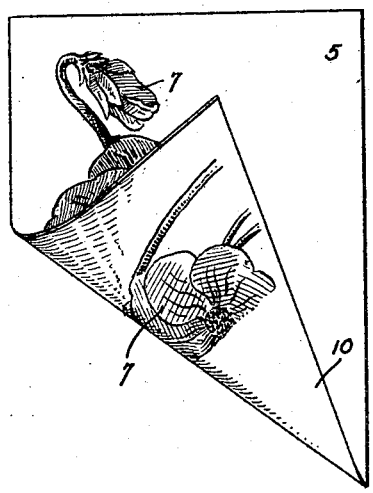
Fig. 2 is a plan view of one of the sheets showing one corner being turned back so as to expose part of the under side.

In the present embodiment of the invention, a book comprising a plurality of leaves 5 is shown, which leaves are bound together in any suitable manner, as by means of wire fasteners 6. Each leaf is provided with a sketch 7 in simulation of any desired article, one-half of which sketch only appearing on a page, the remaining half of the sketch appearing on the opposite page of the leaf. On the page shown at the right in Fig. 1 of the drawings, is a sketch of a flower, and it will be noted that half of the page is blank, as indicated by the reference character 10. Upon the reverse side of the leaf 5 would be shown the other half of the completed sketch. This is more particularly brought out on that page shown in perspective in said figure, in which the sketch 7 in full lines is the tail section of a bird, and that part shown in dotted lines and indicated by the reference character 8, is the remainder of the bird or head section, which if placed opposite to the tail section, would form the completed bird and limb upon which it is perched.

In using a device constructed in accordance with the present invention, the student would study the sketch, say for example the tail section of the bird, until he had obtained a mind's eye picture thereof. After giving the picture the necessary thought to make the proper impression upon his mind, the student would turn the page over and draw from memory that portion of the sketch which he had studied, in the blank space adjacent to the remaining portion of the sketch upon the reverse side thereof, thus completing the sketch. After completing the sketch, the student then turns back to the sketch which he was attempting to copy and compares his work therewith in order that the accuracy thereof may be determined.

In lieu of proceeding in the above-described manner, a piece of tracing paper may be used to trace one portion of the sketch and after that portion has been traced, the remainder of the sketch which has been previously committed to memory may be supplied upon the tracing paper and the part sketched upon the tracing paper may then be placed over the corresponding portion of the sketch in order to determine its accuracy.

While in the present instance, the device has been described as being in the form of a book, it is obvious that any suitable material, such as sheets of celluloid or the like, upon which pencil markings may be erased, may be employed, and I do not wish to be limited to the exact construction and materials shown and described since the use of any materials with which the above described operations may be carried out, clearly fall within the scope of the present invention.

I claim—

1. In a device of the character described, a sheet provided upon one of its sides with a section of a representation to be copied, the remainder of the representation being shown upon the opposite side of the sheet, as and for the purpose set forth.

2. A device of the character described comprising a plurality of pages, one of which has a section of a representation printed thereon and a blank writing surface adjacent thereto, the remainder of said representation being printed upon another page and normally obscured and having adjacent thereto a plain writing surface, as and for the purpose set forth.

3. As a new article of manufacture a sheet having on a portion thereof a representation constituting a fragment of a figure and having a blank space adjacent thereto upon which the representation of the figure may be completed with said fragment as a base.

J NICHOLAS MEYERS.